(12) United States Patent
Martini

(10) Patent No.: US 9,485,228 B2
(45) Date of Patent: *Nov. 1, 2016

(54) SELECTIVELY PERFORMING MAN IN THE MIDDLE DECRYPTION

(71) Applicant: iBoss, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,169

(22) Filed: Sep. 3, 2015

(65) Prior Publication Data

US 2015/0381583 A1 Dec. 31, 2015

Related U.S. Application Data

(63) Continuation of application No. 13/901,515, filed on May 23, 2013, now Pat. No. 9,160,718.

(51) Int. Cl.
*H04L 29/06* (2006.01)
*H04L 29/08* (2006.01)

(52) U.S. Cl.
CPC ....... *H04L 63/0428* (2013.01); *H04L 63/0281* (2013.01); *H04L 63/0464* (2013.01); *H04L 63/20* (2013.01); *H04L 63/168* (2013.01); *H04L 67/02* (2013.01)

(58) Field of Classification Search
CPC H04L 63/0281; H04L 63/0464; H04L 63/20
See application file for complete search history.

(56) References Cited

U.S. PATENT DOCUMENTS

| 5,835,726 | A | 11/1998 | Shwed et al. |
| 6,594,682 | B2 | 7/2003 | Peterson et al. |
| 6,742,047 | B1 | 5/2004 | Tso |

(Continued)

FOREIGN PATENT DOCUMENTS

EP    2 528 299 A1    11/2012

OTHER PUBLICATIONS

Acharya et al., "MPLS-based Request Routing", Jun. 10, 2001. Downloaded from the internet at: http://www.inf.fu-berlin.de/lehre/SS03/19531-V/lecture9.pdf , on Apr. 4, 2013, 9 pages.

(Continued)

*Primary Examiner* — Ellen Tran
(74) *Attorney, Agent, or Firm* — Fish & Richardson P.C.

(57) ABSTRACT

Methods, systems, and apparatus, including computer programs encoded on computer storage media, for selectively performing man in the middle decryption. One of the methods includes receiving a first request to access a first resource hosted by a server outside the network, determining whether requests from the client device to access the first resource outside the network should be redirected to a second resource hosted by a proxy within the network, providing a redirect response to the client device, the redirect response including the second universal resource identifier, establishing a first encrypted connected between the client device and the proxy hosting the second resource, and a second encrypted connection between the proxy hosting the second domain and the server hosting the first resource, and decrypting and inspecting the encrypted communication traffic passing between the client device and the server hosting the first resource.

21 Claims, 4 Drawing Sheets

(56) References Cited

U.S. PATENT DOCUMENTS

| | | | |
|---|---|---|---|
| 7,516,485 | B1 | 4/2009 | Lee et al. |
| 7,606,214 | B1 | 10/2009 | Sekhar et al. |
| 7,761,594 | B1 | 7/2010 | Mowat |
| 7,793,342 | B1 | 9/2010 | Ebrahimi et al. |
| 7,810,160 | B2 | 10/2010 | Dougherty et al. |
| 7,945,779 | B2 | 5/2011 | Martin |
| 8,046,495 | B2 | 10/2011 | Cooper et al. |
| 8,225,085 | B2 | 7/2012 | Karandikar |
| 8,561,181 | B1 | 10/2013 | Hernacki et al. |
| 8,739,243 | B1 | 5/2014 | Martini |
| 2002/0065938 | A1 | 5/2002 | Jungck et al. |
| 2002/0114453 | A1 | 8/2002 | Bartholet et al. |
| 2002/0178381 | A1 | 11/2002 | Lee et al. |
| 2003/0105981 | A1 | 6/2003 | Miller et al. |
| 2003/0131259 | A1 | 7/2003 | Barton et al. |
| 2004/0015725 | A1 | 1/2004 | Boneh et al. |
| 2004/0225895 | A1 | 11/2004 | Mukherjee et al. |
| 2005/0050362 | A1 | 3/2005 | Peles |
| 2005/0204050 | A1* | 9/2005 | Turley ............... H04L 63/105 709/229 |
| 2006/0036572 | A1 | 2/2006 | Kausik |
| 2006/0064750 | A1 | 3/2006 | Kersey et al. |
| 2007/0260871 | A1 | 11/2007 | Paya et al. |
| 2008/0040790 | A1 | 2/2008 | Kuo |
| 2008/0070573 | A1 | 3/2008 | Dutta et al. |
| 2008/0082662 | A1 | 4/2008 | Dandliker et al. |
| 2008/0126794 | A1 | 5/2008 | Wang et al. |
| 2008/0128495 | A1 | 6/2008 | Weintraub et al. |
| 2008/0163333 | A1 | 7/2008 | Kasralikar |
| 2008/0215877 | A1 | 9/2008 | Brabson et al. |
| 2009/0150972 | A1 | 6/2009 | Moon et al. |
| 2009/0193513 | A1 | 7/2009 | Agarwal et al. |
| 2009/0254990 | A1 | 10/2009 | McGee |
| 2010/0138910 | A1 | 6/2010 | Aldor et al. |
| 2010/0218248 | A1 | 8/2010 | Nice et al. |
| 2010/0242092 | A1 | 9/2010 | Harris |
| 2010/0313016 | A1 | 12/2010 | Zhang et al. |
| 2011/0083154 | A1 | 4/2011 | Boersma |
| 2011/0231929 | A1 | 9/2011 | Rao et al. |
| 2012/0290829 | A1 | 11/2012 | Altman |
| 2013/0117400 | A1 | 5/2013 | An et al. |

OTHER PUBLICATIONS

Big-IP, "BIG-IP ® Solutions Guide, Version 4.2", 2002, downloaded from the internet at http://support.f5.com/content/kb/en-us/archived_products/big-ip/manuals/product/bag42/_jcr_content/pdfAttach/download/file.res/BIG-IP_Controller_Solutions_Guide%2c_version_4.2 pdf on Apr. 4, 2013, 214 pages.

Blue Coat White Paper (How to Gain Visibility and Control of Encrypted SSL Web Sessions), 2007, downloaded from the internet at: https://www.bluecoat.com/sites/default/files/documents/files/How_to_Gain_Visibility_and_Control_of_Encrypted_SSL_Web_Sessions.a.pdf on Dec. 10, 2013, 13 pages.

Burkholder, "SSL Man-in-the-Middle Attacks," *Reading Room SANS*, 2002, downloaded from the internet at: http://www.sans.org/reading_room/whitepapers/threats/ssl-man-in-the-middle-attacks_480, on May 16, 2013, 17 pages.

Faruque, "Open Source Open Standard", Sep. 28, 2012, downloaded from the internet at: http://tektab.com/2012/09/28/squid-transparent-proxy-for-https-ssl-traffic/ on Apr. 26, 2013 5 pages.

Glype.com, "Glype Proxy Script", May 2, 2013, downloaded from the internet at http://www.glype.com/ on May 2, 2013, 2 pages.

Molnar, "How to set up OpenDNS for content filtering, visited sites log, etc.," Jun. 22, 2011, downloaded from the internet at: http://www.hotspotsystem.com/hotspot_help/kb/articles/113-how-to-set-up-opendns-for-content-filtering-visited-sites-log-etc on May 3, 2013 7 pages.

Murdoch, et al. "Tools and Technology of Internet Filtering," Dec. 2011, http://oni-access.net/wp-content/uploads/2011/12/accessdenied-chapter-3.pdf, on May 16, 2013, 16 pages.

Nayak et al. "Different Flavours of Man-In-The-Middle Attack, Consequences and Feasible Solutions", 3rd IEEE International Conference on Computer Science and Information Technology (ICCSIT), Jul. 9-10, 2010, pp. 491-495.

Portswigger, Ltd. "Burp Proxy Options", Apr. 26, 2013, downloaded from the internet at: http://portswigger.net/burp/help/proxy_options.html#listerners_cert on April 26, 2013, 4 pages.

Portswigger, Ltd. "Getting Started with Burp Suite", Apr. 26, 2013, downloaded from the internet at: http://portswigger.et/burp/help/suite_gettingstarted.html, on Apr. 26, 2013, 4 pages.

Proxy.appspot.com, "My Proxy Server", Apr. 26, 2013, downloaded from the internet at: http://mvv-proxy.appspot.com/ on April 26, 2013, 1 page.

Rousskov, "Feature: Squid-in-the-middle SSL Bump," Apr. 20, 2012, downloaded from the internet at: http://wiki.squid-cache.org/Features/SslBump on Apr. 26, 2013, 2 pages.

Ryan, "URL vs URI vs URN: The Confusion Continues" , Jan. 18, 2011, downloaded from the internet at: http://damnhandy.com/2011/01/18/url-vs-uri-vs-urn-the-confusion-continues/ on December 10, 2013, 7 pages.

Security Stack Exchange, "How do I check that I have a direct SSL connection to a website?" May 7, 2012, downloaded from the internet at: http://security.stackexchange.com/questions/14676/how-do-i-check-that-i-have-a-direct-ssl-connection-to-a-website on Apr. 26, 2013, 2 pages.

vonRandow, "SSL Proxying", Apr. 26, 2013, downloaded from the internet at: http://www.charlesproxy.com/documentation/proxying/ssl-proxying/ on Apr. 26, 2013, 2 pages.

Websense, Inc., "DNS Proxy Caching", 2011, downloaded from the internet at http://www.websense.com/content/support/library/web/v76/wcg_help/dns_proxy_caching.aspx on Apr. 4, 2013, 2 pages.

Wikipedia, "Proxy server", Apr. 21, 2013, downloaded from the internet at: http://en.wikipedia.org/w/index.php?title=Proxy_server&oldid=551454120 on Oct. 31, 2014, 12 pages.

International Search Report and Written Opinion issued in International Application No. PCT/US2014/034236, mailed Jul. 24, 2014, 11 pages.

International Search Report and Written Opinion issued in International Application No. PCT/US2014/037009, mailed Nov. 11, 2014, 10 pages.

Anonymous: "HTTP 302—Wikipedia, the free encyclopedia", , Mar. 25 2013, pp. 1-2, XP055166412, Retrieved from the Internet: URL:http://en.wikipedia.org/w/index.php?title=HTTP 302 &oldid=546866162 [retrieved on Feb. 2, 2015].

Anonymous: "Java Practices—Forward versus redirect", , Dec. 27, 2012, pp. 1-2, XP055166404, Retrieved from the Internet: URL:http://web.archive.org/web/20121227015318/http://www.javapractices.com/topic/TopicAction.do?Id=181 [retrieved on Feb. 2, 2015].

International Search Report and Written Opinion issued in International Application No. PCT/US2014/039231, mailed Feb. 11, 2015, 12 pages.

International Preliminary Report on Patentability issued in International Application No. PCT/US2014/039231, issued Nov. 24, 2015, 8 pages.

* cited by examiner

SELECTIVELY PERFORMING MAN IN THE MIDDLE DECRYPTION

CROSS-REFERENCE TO RELATED APPLICATIONS

This application is a continuation application of and claims priority to U.S. application Ser. No. 13/901,515, filed on May 23, 2013.

TECHNICAL FIELD

This specification relates to systems and techniques that facilitate monitoring of secure communications packets, for example, to allow one or more policies to be applied to the secure communications packets.

BACKGROUND

A computer network is a collection of computers and other hardware interconnected by communication channels that allow sharing of resources and information. Communication protocols define the rules and data formats for exchanging information in a computer network. A gateway on a network is a node on the network equipped for interfacing with another network or networks. The gateway is often used for passing data between devices on different networks. Transport Layer Security (TLS) and Secure Socket Layer (SSL) are two examples of cryptographic communication protocols that provide communication security by allowing devices to exchange encrypted, as opposed to plaintext, messages.

SUMMARY

In general, one aspect of the subject matter described in this specification can be embodied in methods that include the actions of receiving, from a client device within the network, a first request to access a first resource hosted by a server outside the network, the first request including a first universal resource identifier that identifies the first resource, determining, based on one or more policies in a policy group associated with the client device, whether requests from the client device to access the first resource outside the network should be redirected to a second resource hosted by a proxy within the network, wherein a second universal resource identifier identifies the second resource, providing, based on determining that requests from the client device to access the first domain outside the network are to be redirected to the second domain within the network, a redirect response to the client device, the redirect response including the second universal resource identifier, establishing a first encrypted connected between the client device and the proxy hosting the second resource, and a second encrypted connection between the proxy hosting the second domain and the server hosting the first resource, to facilitate encrypted communication traffic between the client device and the server hosting the first resource, and decrypting and inspecting the encrypted communication traffic passing between the client device and the server hosting the first resource. Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them, installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation may include all the following features in combination. The inspecting may comprise applying one or more first security policies to the decrypted communication traffic, the first security policies being included in the policy group. The method may further comprise blocking communication traffic between the client device and the server hosting the first resource upon determining that one or more second security policies have been violated, the second security policies being included in the policy group. The method may further comprise modifying communication traffic between the client device and the server hosting the first resource based on the content of the communication traffic.

In some implementations, the providing comprises appending one or more client device parameters to the redirect response, the client device parameters identifying one of the client device and the policy group, the establishing comprises receiving the client device parameters from the client device, and the inspecting comprises identifying the policy group using the parameters and selecting the first security policies from the policy group.

In some implementations, the providing comprises sending a cookie to the client device, the establishing comprises receiving one or more parameters included in the cookie from the client device, and the inspecting comprises identifying the policy group using the parameters from the cookie and selecting the first security policies from the policy group. The inspecting may comprise identifying the policy group associated with the client device based on the internet protocol address of the client device and selecting the first security policies from the policy group. The encrypted communication traffic between the client device and the server hosting the first domain may pass through the proxy. The decrypting and inspecting may be performed at the proxy. The receiving, determining and providing may be performed by a web gateway device. The proxy may comprise a proxy server device separate from the web gateway device.

In some implementations, the method further comprises providing, based on determining that requests from the client device to access the first resource outside the network are to be redirected to the second resource within the network and prior to the establishing, instructions for presentation of a user interface to the client device, the instructions including a user notification regarding the redirect from the first resource to the second resource and a continue with connection user interface element for receiving input from a user, the input indicating whether to establish the first encrypted connection and the second encrypted connection, receiving input indicating that the first encrypted connection and the second encrypted connection should be established, and establishing the first encrypted connection and the second encrypted connection based on receiving the input. The first encrypted connection with the client device may comprise providing the client device with a security certificate. The method may further comprise receiving, by the proxy and prior to receiving the establishing, the security certificate from a trusted certificate authority.

The subject matter described in this specification may be implemented in various implementations to realize one or more of the following potential advantages. In some implementations, the use of a security certificate by a proxy server allows the proxy server to create a secure connection with a client device while the proxy server decrypts and inspects data received from the client device and a user interface on the client device indicates that the secure connection, and the proxy server, can be trusted. In some implementations, redirecting a client device to a domain hosted by a proxy server allows a network to selectively inspect encrypted network traffic and the client device to create authenticated secure network connections with the proxy server without installing a trusted certificate for the domain on each client device that connects to the network. In some implementations, redirecting a client device to a domain hosted by a proxy server allows devices, which are not controlled by an organization, to access secure connections using the organizations network without installing trusted certificates for the domain on the devices. In certain implementations, encrypted traffic is inspected at network egress and ingress, allowing a network administrator to enforce security policies consistently across both encrypted traffic and plaintext traffic. In some implementations, by using standard communication protocols, client devices (e.g. cell phones, tablets, laptops) can join a network with little or no special configuration.

Details of one or more implementations are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

When data on a network is encrypted (e.g., by SSL or TSL) the data can pose challenges to network security appliances and routines in that data encryption makes it difficult to inspect the data as the data is transferred between end user devices and servers on the Internet. This can lead to problems such as viruses being transferred over secure connections and entering a network instead of being blocked because a gateway security appliance could not inspect the data that included a virus. In addition, organizational policies cannot be applied to the encrypted data since the data is protected, causing security functions to fail as they cannot inspect the data.

Described in this document is a use of man in the middle (MitM) decryption based on rules indicating which domain communications should pass through a MitM gateway and be decrypted and which domain communications should be passed directly to the corresponding Internet destination. A network gateway determines whether a request to access a certain domain should be forwarded to a remote computer hosting the domain or should be redirected to a local domain hosted by a local computer so that encrypted data that passes through the local computer can be decrypted and inspected before being encrypted and forwarded to a remote computer. This allows some encrypted content to pass directly from a client device to a remote computer, such as when a user accesses an online bank account, while other encrypted content, such as social networking data, is inspected by the local computer for compliance with one or more polices.

A computer network typically has one or more gateways that allow communication between devices on the network and devices on other networks (e.g. the Internet). One such gateway can be a network gateway that routes plaintext (i.e., non-encrypted) traffic among devices within the network and devices outside of the network. One common type of plaintext traffic that is routed through a network gateway is an HTTP GET request, which is a request sent to a server for a representation of a resource identified by a uniform resource identifier (URI) or a uniform resource locator (URL) (e.g., that includes a domain name).

Instead of passing all HTTP GET requests to the servers associated with the requests, the network gateway intercepts some of the HTTP GET requests if the network gateway determines that traffic between the network devices and the URLs or URIs will be encrypted and that the traffic is not likely to contain sensitive user information. For these HTTP GET requests, the network gateway can provide the network device with a redirect response identifying another domain that is hosted by one or more man in the middle gateways in the network. The MitM gateways may then act as man in the middle proxies for the resource at the URL or URI, allowing secure communication that can be inspected when entering or exiting the network.

Figure 1:
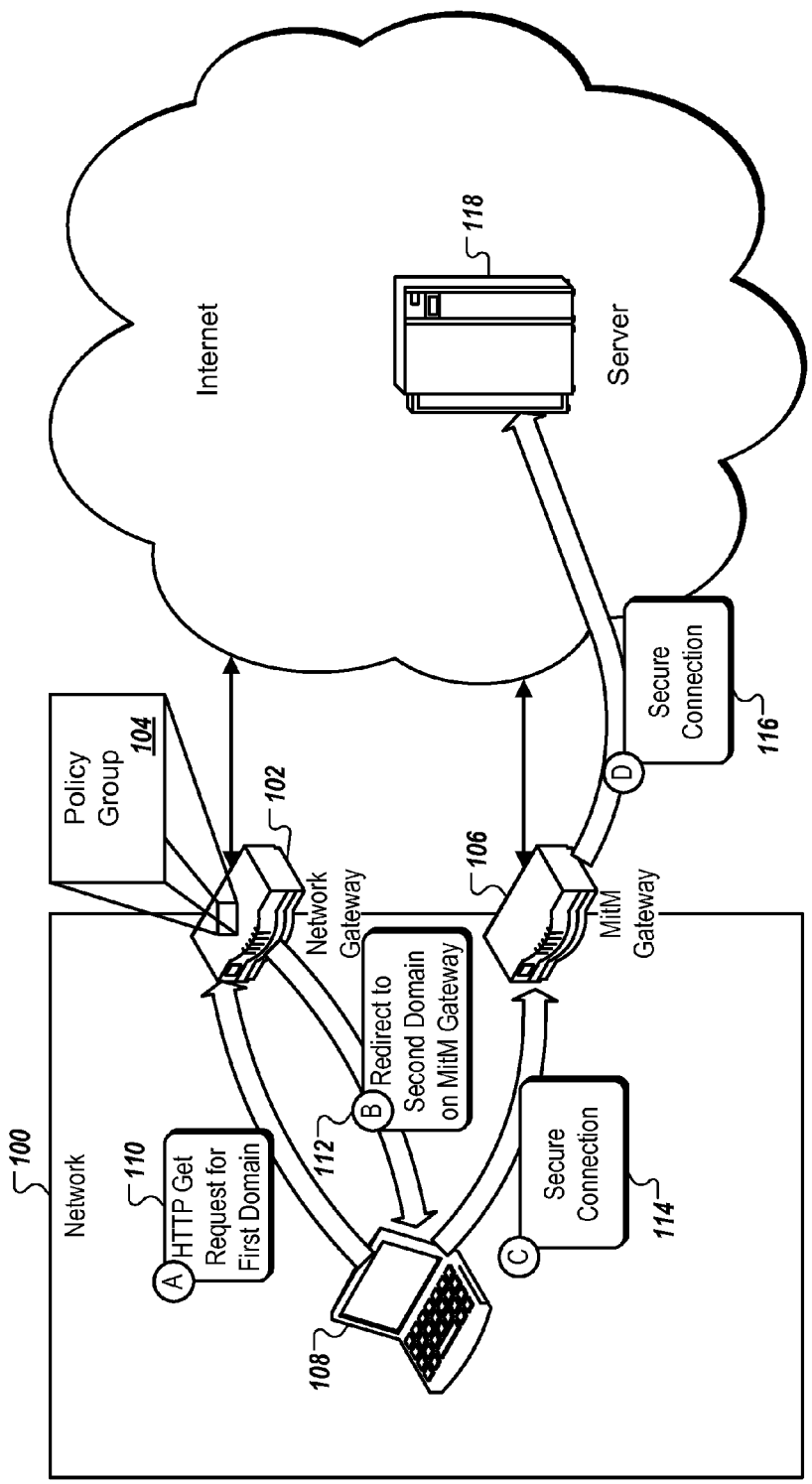
FIG. 1 is a block diagram of a network with a network gateway and a man in the middle gateway.

FIG. 1 is a block diagram of a network 100 with a network gateway 102 and a MitM gateway 106. Also shown in the network 100 is a client device 108, which represents any appropriate computing device capable of accessing resources outside of the network 100. While not shown for clarity's sake, the network 100 can include other elements including, but not limited to, wireless and/or wired access points, file and/or application servers, routers, and network cables, as well as additional client devices 108, network gateways 102, and/or MitM gateways 106.

The network 100 can be configured to route some or all of the plaintext messages addressed outside the network to the network gateway 102. The network gateway 102 can inspect the plaintext messages and, optionally, modify or drop (i.e., block) some messages. For example, the network gateway 102 may be configured to prevent traffic from a particular class of application (e.g., chat, files sharing). The network gateway 102 may also be configured to intercept messages intended for a recipient outside of the network 100 and reply directly. This process is sometimes referred to as spoofing.

For example, the network gateway may intercept and examine an HTTP GET request 110 from the client device 108 that requests access to a first domain hosted by a server 118 outside of the network 100. Based on, for example, the URL or URI of the first domain identified in HTTP GET request 110 and a policy group 104, associated with the client device 108, that indicates domains that may be accessed by the client device 108 without the inspection of communications with a computer hosting the domain and/or domains where the communications with a computer hosting the domain should be decrypted and inspected, the network gateway 102 determines that, instead of passing the HTTP GET request 110 to the server 118, the network gateway 102 should respond to the HTTP GET request 110 with a redirect response 112 that identifies a second domain hosted by the MitM gateway 106.

The network gateway 102 may be configured to make this determination so that encrypted communication from the client device 108 first passes through the MitM gateway 106, thereby allowing the MitM gateway 106 to decrypt the communication and perform man in the middle data inspection before allowing the communication to pass out of the network 100. The network gateway 102 may make the determination to pass encrypted communication through the MitM gateway 106 based on one or more security policies in the policy group 104 as applied to the network 100. While passing communication through the MitM gateway 106 may provide other benefits (e.g., caching of frequently visited resources to reduce bandwidth usages), the policy group 104 may be configured to primarily or exclusively account for the security considerations of passing communications through the network gateway 102 or the MitM gateway 106.

The client device 108, upon receiving the redirect response 112, can provide a new HTTP GET request that identifies the second domain to the MitM gateway 106 and initialize a secure connection 114 with the MitM gateway 106. The secure connection 114 may be an SSL connection, a TLS connection, or any other appropriate secure session. The MitM gateway 106 then initializes a secure connection 116 with the server 118 that hosts the resource identified by the URL or URI of the first domain identified in the HTTP GET request 110.

Once the secure connections 114 and 116 are established, the client device 108 and the server 118 may communicate with each other. In this communication, the MitM gateway 106 acts as a proxy of the server 118 for the client device 108 and as a proxy of the client device 108 for the server 118. The MitM gateway 106 is thus able to receive an encrypted message from the client device 108, decrypt the message, inspect the message, optionally alter or drop the message, encrypt the possibly altered message into a second encrypted form, and pass the message to the server 118. The MitM gateway 106 may perform the same type of reception, decryption, inspection, alteration or drop, encryption, and passage with messages from the server 118 to the client device 108. The MitM gateway 106 may sometimes be referred to by other terms including, but not limited to, a reverse proxy, intercepting proxy, accelerator, accelerating proxy, and transparent proxy.

The inspection, alteration, and dropping can allow the MitM gateway 106 to ensure that encrypted communication into and out of the network 100 conforms to any number of policies (e.g., included in a plurality of policy groups, such as the policy group 104). For example, the network 100 may have a policy of inspecting incoming messages for computer viruses, malware, or other unwanted content. The network gateway 102, handling plaintext messages, can inspect the payloads of the messages and drop any messages that match viral signatures, malware black-lists, etc. The MitM gateway 106 may apply the same policy, inspecting incoming messages in their decrypted state and dropping any messages that fail the same tests as applied by the network gateway 102.

The network gateway 102 selectively provides redirect responses to the client device 108 based the policy group 104 associated with the client device 108. For example, when the network gateway 102 receives a request from the client device 108 to access a first domain associated with a bank, the network gateway 102 allows the client device 108 to connect directly to a server hosting the first domain without providing the client device 108 with the redirect response 112 based on determining that a policy in the policy group 104 allows the client device 108 to access banking websites.

However, when the network gateway 102 receives a request from the client device 108 to access a first domain associated with a different type of content (e.g., social networking, a bulletin board service, or an unknown content type) as specific by the policy group 104 associated with the client device 108, the network gateway 102 provides the client device with the redirect response 112 to allow the MitM gateway 106 to decrypt communications between the client device 108 and the server 118 and to apply one or more policies from the policy group 104 to the communications.

Alternatively, when another client device that is associated with another policy group, different from the policy group 104, provides the network gateway 102 with a request to access a social networking website, the network gateway 102 allows the other client device to connect directly to the server 118 that hosts the social networking website based on the other policy group associated with the other client device.

In some implementations, the data sent by the MitM gateway 106 to the server 118 passes through the network gateway 102. For example, when the MitM gateway 106 establishes the secure connection 116 with the server 118, the MitM gateway 106 passes encrypted data through the network gateway 102, and the network gateway 102 forwards the encrypted data to the server 118 based on determining that the encrypted data is from the MitM gateway 106. When the network gateway 102 receives additional encrypted data from the MitM gateway 106 that is also addressed to the server 118, the network gateway 102 continues to allow the encrypted data to go to the server 118.

In some implementations, when the network gateway 102 receives encrypted data from the client device 108, the network gateway 102 determines, based on the policy group 104 associated with the client device 108, whether the encrypted data should be provided to the server 118. For example, when the client device 108 is an employee's laptop and the policy group 104 includes a policy that encrypted data from the client device 108 should be inspected, the network gateway 102 drops encrypted data that is received directly from the client device 108. In these implementations, when the network gateway 102 receives encrypted data from the MitM gateway 106, the network gateway 102 forwards the encrypted data to the destination associated with the encrypted data.

In some implementations, the network gateway 102 is the same device as the MitM gateway 106. For example, the network gateway receives the HTTP GET request 110 from the client device 108, provides the redirect response 112 to the client device 108, and establishes the secure connection 114 with the client device and the secure connection 116 with the server 118.

In some implementations, when the MitM gateway 106 modifies a request from the client device 108 or a response from the server 118, the MitM gateway 106 updates a URI or a URL included in the request or the response. For example, when the MitM gateway 106 receives a request identifying the second domain, the MitM gateway 106 creates an updated request by changing all occurrences of the second domain to the first domain in the request and provides the updated request to the server 118. Similarly, when the MitM gateway 106 receives a response from the server 118, the MitM gateway 106 may change all occurrences of the first domain to the second domain to generate an updated response and provide the updated response to the client device 108.

Figure 2:
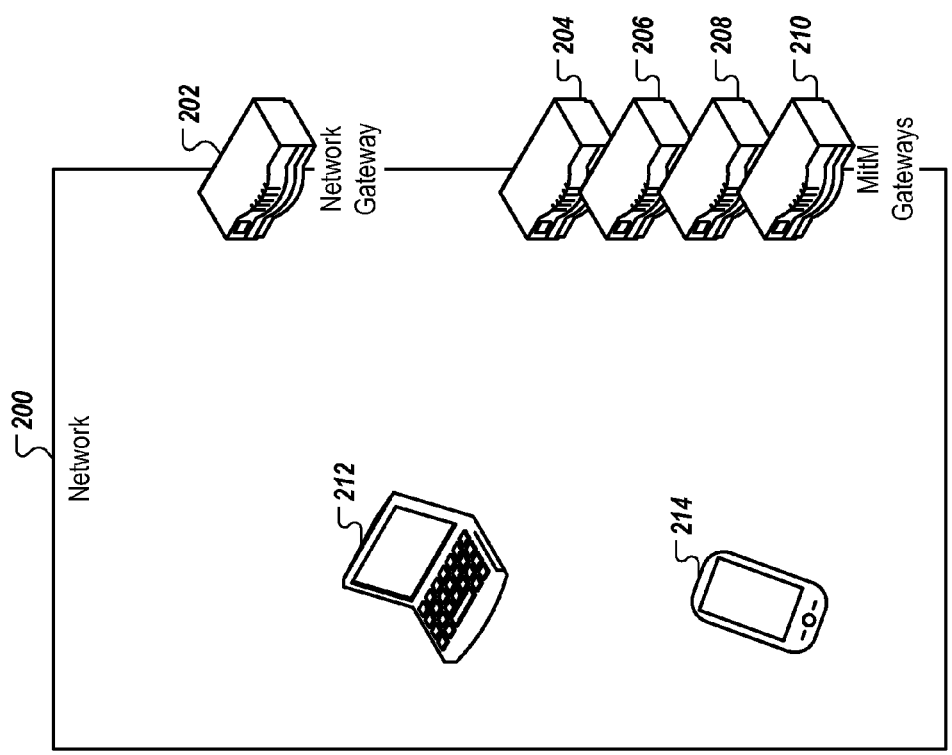
FIG. 2 is a block diagram of a network with a network gateway and a group of man in the middle gateways.

FIG. 2 is a block diagram of a network 200 with a network gateway 202 and a group of MitM gateways 204-210. The network 200 can be configured to route some or all of the plaintext messages addressed outside the network to the network gateway 202. The network gateway 202 can inspect the plaintext messages and, optionally, modify or drop a message. The network gateway 202 may also be configured to intercept and examine HTTP GET requests from user devices 212 and 214 and provide redirect responses identifying a domain hosted by one or more of the MitM gateways 204-210.

In general, decryption and encryption of network data may be a computationally intensive task for network appliances such as gateways. To alleviate performance issues, and for other reasons, the network gateway 202 and the group of MitM gateways 204-210 may be used to share or balance the load of the MitM gateways 204-210. The network gateway 202 may respond to an HTTP GET request from the user device 212 or 214 with a redirect response identifying a domain hosted by all available MitM gateways 204-210 in the network 200. The user devices 212 or 214 may then initiate a secure connection with one the MitM gateway 204-210 in order to attempt to receive a resource associated with the domain.

For example, when the user device 212 requests access to a first domain, such as "mysocialnetwork.com," the network gateway 202 receives the request, determines one or more policies associated with the user device 212 or a user operating the user device 212, and provides a redirect response to the user device 212 where the redirect response identifies another domain, such as "mysocialnetwork.localnetwork.com" or "localnetwork.com/mysocialnetwork." The user device 212 then uses the second domain, such as "mysocialnetwork.localnetwork.com," to establish a connection with one or more of the MitM gateways 204-210.

The network gateway 202 and the group of MitM gateways 204-210 route different classes of traffic to different MitM gateways 204-210. This may be desirable, for example, if policies of the network 200 specify that different policy tests should apply to different classes of encrypted traffic. For example, the network gateway 202 provides redirect responses for connection requests for less sensitive sites and does not provide a redirect response for more sensitive sites, such as banking and credit card sites.

Further, a browser on the user device 212 will present the first domain when the browser connects with a more sensitive site and will present the second domain when the browser connects with a less sensitive site. For example, when the browser sends a request to access "mybank.com" or another sensitive site, the address presented in the browser may be "https://www.mybank.com" once the user device 212 establishes a connection with a server hosting www.mybank.com. Alternatively, when the browser sends a request to access "mysocialnetwork.com" or another less sensitive site, the address presented in the browser may be "https://mysocialnetwork.localnetwork.com" once the user device 212 establishes a connection with the MitM gateways 204-210.

Presentation of the actual domain that the user device 212 is connected with allows the user of the user device 212 to determine whether the data associated with the domain is being monitored by the MitM gateways 204-210. Since only select sites may be subject to MitM inspection, the concerns for data loss may be greatly reduced.

In one example, the MitM gateway 204 may be configured to handle encrypted traffic that is generally unrestricted. That is, the encrypted traffic may not be inspected, modified, or dropped at all, or may be only minimally inspected (e.g., encrypted Virtual Private Network traffic to and from a network at a branch office). For another class of traffic, the network administrator may wish to inspect only incoming traffic for virus, malware, or other malicious code (e.g., encrypted traffic to banking or financial institutions). For a third class of traffic, the network administrator may wish to inspect outgoing traffic to make sure secret or proprietary data is not being transmitted and inspect incoming traffic for malicious code (e.g., social networking and hosted storage sites). For a fourth class of data, a hosted application provider may share the same IPs for some services that should be permitted and for some services that should be blocked (e.g., an application provider hosts email and document sharing, which should be allowed, as well as media streaming, which should be blocked).

In this example, the MitM gateways 204-210 can be configured as follows:

| | |
|---|---|
| MitM gateway 204 | Perform no inspection of data. |
| MitM gateway 206 | Inspect and drop incoming data that contains malicious code. |
| MitM gateway 208 | Inspect and drop incoming data that contains malicious code. Inspect and drop outgoing data that contains secret or proprietary data. |
| MitM gateway 210 | Inspect and drop incoming data that contains malicious code. Determine which service the data is associated with, dropping any related to blocked services. |

To route traffic from the user devices 212 and 214, the network gateway 202 may inspect received HTTP GET requests and determine which of the MitM gateways 204-210 should handle the encrypted traffic. For example, each policy group associated with a user group on the network 200 may have a list that maps URLs and URIs to categories based on the type of content available at the URL or URI. When the network gateway 202 receives a HTTP GET request, the network gateway 202 can compare the URL or URI identified by the HTTP GET request to the list. If the request's URL or URI is not on the list, the network gateway 202 can pass the HTTP GET request to a server that hosts a domain identified in the HTTP GET request. If the URL or URI is on the list, the network gateway 202 can respond to the requesting user device 212 or 214 with a redirect response identifying another domain that is hosted by the corresponding one of the MitM gateways 204-210 configured to handle traffic associated with the category that the URL or URI falls under.

Two user devices 212 and 214 are shown in FIG. 2, however, these user devices and other user devices can enter and exit the network 200 over time. For example, a worker may bring one or more of their employer's or their own devices (e.g., laptop, phone, tablet) into the network 200 at the start of the day and remove the devices at the end of the day when the worker goes home. Other than the configurations need to join the network (e.g. Wi-Fi passwords, plugging in Ethernet cords), the network 200 need not require any special configuration to ensure that encrypted traffic is routed through the correct MitM gateways 204-210 due to the fact that all messages to and from the user devices conform to standards that are commonly supported on many common hardware, operating system, and browser systems.

In some implementations, the MitM gateways 204-210 are not connected directly to the network 200. For example, one or more MitM gateways 204-210 may connect to the network 200 over the Internet. In this example, the MitM gateways 204-210 provide the network 200 with a cloud proxy service that monitors communications between the user devices 212 and 214 on the network 200 and external resources, whether the communications are encrypted or in plaintext.

This allows the MitM gateways 204-210 to monitor traffic for multiple networks in addition to the network 200, where the MitM gateways 204-210 may apply different usage policies to the devices associated with the different networks, in addition to different usage policies within a network depending on the user groups or organizational units associated with the user devices.

In certain implementations, an HTTP GET request may include a key that the MitM gateways 204-210 use to identify the usage policies associated with a specific user device that sent the HTTP GET request to the MitM gateways 204-210. For example, the network gateway 202 may include a key in a redirect response that the network gateway 202 provides to the user device 212. When the user device 212 sends an HTTP GET request to the MitM gateways 204-210, the user device 212 includes the key in the HTTP GET request and the MitM gateways 204-210 use the key to identify the usage policy or usage policy group associated with the user device 212 and the HTTP GET request.

In some implementations, when an initial HTTP GET request received by the MitM gateways 204-210 does not include a key but the MitM gateways 204-210 require the key to determine a usage policy or a usage policy group associated with the HTTP GET request, the MitM gateways 204-210 do not allow the user device associated with the initial HTTP GET request to access a requested resource. For example, the MitM gateways 204-210 require the key in the initial HTTP GET request to determine the usage policy to apply to all additional HTTP GET requests received from the user device that are associated with a particular requested resource, and requests received by the MitM gateways 204-210 after the initial HTTP GET request (i.e., after a connection is established between the MitM gateways 204-210 and the user device) do not need to include the key since the MitM gateways 204-210 have already identified the usage policy or usage policy group to apply to the additional requests.

Figure 3:
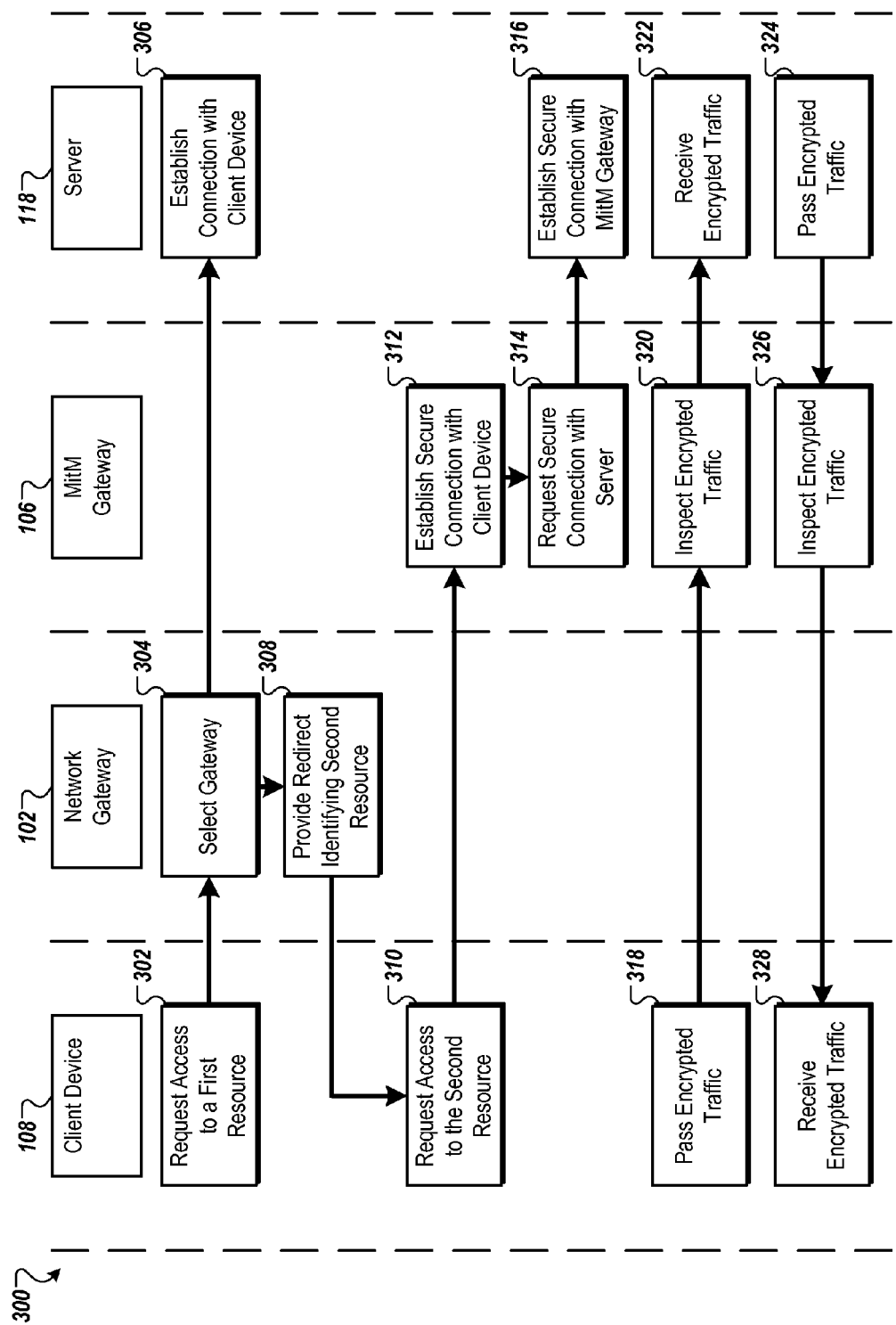
FIG. 3 is a swim-lane diagram of an example process for establishing a communication link through a man in the middle gateway.

FIG. 3 is a swim-lane diagram of an example process 300 for establishing a communication link through a MitM gateway. The process 300 is described with reference to the components shown in FIG. 1. However, other components, including and not limited to the components shown in FIG. 2, can be used to perform the process 300 or a similar process.

The client device 108 creates a request to access a first resource hosted by the server 118 outside of the network 100 (302). For example, a user may request to download, from a hosted storage system, a data object identified by a first unique URI. The client device 108 can create an HTTP GET request that includes the data object's URI and send the HTTP GET request to the network gateway 102.

The network gateway 102 receives the request and selects a MitM gateway to be used for traffic associated with the first resource (304). For example, the network gateway 102 can process a set of rules, included in the policy group 104, to determine whether to decrypt data associated with a specific resource, domain, type of domain, or URI, or to pass the encrypted data directly to the Internet destination. The policy group 104 may include, for example, a list of domain names and IP address mapped to security policies, content classifications, or directions for handling of network traffic (e.g., specifying that the traffic should be decrypted and inspected). By performing this determination on an HTTP GET request for a resource, the network gateway 102 handles all requests to a resource during a single user session in the same way.

If the network gateway 102 determines that the HTTP GET request should be provided directly to the Internet destination, the client device 108 and the server 118 establish a connection through the network gateway 102 (306). For example, if the network gateway 102 determines that the client device 108 is likely to start an unencrypted communication session with the hosted storage system, the network gateway 102 can pass the HTTP GET request to the server 118 and permit the client device 108 to create an unencrypted connection with the server 118. Alternatively, if the network gateway 102 determines that the client device 108 is requesting access to a website that hosts confidential user information (e.g., a banking website or a government website) or that the client device 108 may otherwise access without monitoring or traffic inspection based on the policy group 104, the network gateway 102 passes the HTTP GET request to the server 118.

If the network gateway 102 determines that data associated with the request should be decrypted and inspected, the network gateway 102 provides a redirect response identifying a second resource to the client device 108 where the second resource is hosted by the MitM gateway 106 (308). For example, the network gateway 102 may have a record of past connections with the hosted storage system and determine that the hosted storage system usually communicates through encrypted communication channels. In such a case, the network gateway 102 may select the MitM gateway 106 for the communication between the client device 108 and the server 118 and thus provides the redirect response that identifies the second resource, hosted by the MitM gateway 106, or a second unique URI that identifies the second resource to the client device 108. In some implementations, the client device 108 has no indication that the second resource is hosted by the MitM gateway 106 and not the server 118.

The client device 108 sends a request to access the second resource hosted by the MitM gateway 106 (310). For example, the client device 108 may send to the MitM gateway 106 an SSL Hello or other encryption handshake message indicating the second resource or the second URI that identifies the second resource.

The client device 108 and the MitM gateway 106 establish a first encrypted connection (312). For example, the MitM gateway 106 may act as a proxy of the server 118, mimicking the interface of the server 118 in communications with the client device 108.

The MitM gateway 106 requests an encrypted connection with the server 118 (314). For example, the MitM gateway 106 uses the second resource, or the second URI, and the policy group 104 to determine the first resource the client device 108 requested to access and requests an encrypted connection with the server 118 on behalf of the client device 108.

The MitM gateway 106 and the server 118 establish a second encrypted connection (316). For example, the MitM gateway 106 may act as a proxy of the client device 108, mimicking the interface of the client device 108 in communications with the server 118. The two encrypted sessions may be of the same or different formats or types.

The client device 108 generates traffic, encrypts the traffic into a first encrypted form, and passes the encrypted traffic to the MitM gateway 106 (318). For example, the client device can create an HTTP GET request for a data object, encrypt the HTTP GET request according to the requirements of the first encrypted connection with the MitM gateway 106, and pass the encrypted HTTP GET request to the MitM gateway 106.

The MitM gateway 106 receives the encrypted traffic from the client device 108, decrypts the traffic, inspects the decrypted traffic, encrypts the traffic into a second encrypted form, and passes the traffic to the server 118 (320). For example, the MitM gateway 106 can decrypt the encrypted message into plaintext and determine that the message is an HTTP GET request. The MitM gateway 106 can compare the HTTP GET request with the rules of the policies in the policy group 104 that apply to traffic leaving the network 100. If the HTTP GET request does not violate any of the policies in the policy group 104, the MitM gateway 106 can encrypt the HTTP GET request according to the requirements of the second encrypted connection with the server 118 and pass the encrypted HTTP GET request to the server 118. If the HTTP GET request violates a policy, the MitM gateway 106 modifies or drops (i.e., blocks) the HTTP GET request, as specified by the violated policy or policies.

The server 118 receives the traffic in the second encrypted form (322). For example, the server 118 may receive the encrypted HTTP GET request, decrypt the HTTP GET request, and determine that the user of the client device 108 has authorization to access the requested data object.

The server 118 generates traffic, encrypts the traffic into a third encrypted form, and passes the traffic to the MitM gateway 106 (324). For example, the server 118 can access the requested data object, format the data object into XML or other appropriate format, and add the XML object to an HTTP reply. The server 118 can encrypt the HTTP reply according to the requirements of the second encrypted connection with the MitM gateway 106 and pass the encrypted HTTP reply to the MitM gateway 106

The MitM gateway 106 receives the encrypted traffic, decrypts the traffic, inspects the traffic, encrypts the traffic into a fourth form, and passes the traffic to the client device 108 (326). For example, the MitM gateway 106 can decrypt the encrypted message into plaintext and determine that the message is an HTTP reply. The MitM gateway 106 can compare the HTTP reply with the rules of the policies in the policy group 104 that apply to traffic entering the network 100. If the HTTP reply does not violate any policy, the MitM gateway 106 can encrypt the HTTP reply according to the requirements of the first encrypted connection with the client device 108 and pass the encrypted HTTP reply to the client device 108. If the HTTP reply violates a policy (e.g., contains malicious code, too large), the MitM gateway 106 modifies or drops (i.e., blocks) the reply, as specified by the violated policy or policies.

The client device 108 receives the encrypted traffic (328). For example the client device 108 can decrypt the HTTP reply, extract the XML object, and store the XML object to disk. The client device 108 may also present information associated with the XML object to a user of the client device 108, for example in a user interface.

Although a particular number, type, and order of operations are shown here, other numbers, types, and orders of operations are possible. For example, if there are multiple MitM gateways available, a first MitM may receive the traffic from the client device 108 (e.g., perform step 320) and a second MitM may receive the traffic from the server 118 (e.g., perform step 326). In another example, the client device 108 and the server 118 may create and pass encrypted traffic in the opposite order shown here or substantially at the same time.

In some implementations, the process 300 can include additional steps, fewer steps, or some of the steps can be divided into multiple steps. For example, the MitM gateway 106 may request a security certificate associated with the second resource from a trusted certificate authority prior to establishing the first encrypted connection with the client device 108. The MitM gateway 106 then provides the security certificate to the client device 108 when establishing the first encrypted connection and, based on the security certificate, an application on the client device 108 that is associated with the encrypted connection presents information to a user indicating that the first encrypted connection is authenticated.

The use of the security certificate allows the client device 108 to authenticate the MitM gateway 106 without requiring the installation of a trusted certificate for the second resource on the client device 108 prior to the creation of the first secure connection 114, and without requiring the installation of a trusted certificate for the second resource on all other devices on the network 100, potentially reducing the amount of setup required for the network (e.g., a network administrator does not need to installed the trusted certificate on all devices that connect to the network 100). Further, the use of the security certificate allows devices not owned or controlled by the organization that operates the network 100 to connect to the network 100 and allows the MitM gateway 106 to monitor secure connections with these devices without requiring the organization to install a trusted certificate on the devices, while applications on the devices present information to a user indicating that secure connections that pass through the MitM gateway 106 are authenticated.

In some implementations, the network gateway 102 or the MitM gateway 106 provide the client device 108 with instructions for presentation of a user interface where the instructions include a user notification regarding the redirect from the first URI (e.g., mysocialnetwork.com) to the second URI (e.g., mysocialnetwork.localnetwork.com). For example, based on determining that requests from the client device to access the first resource, identified by the first URI, outside the network are to be redirected to the second resource, identified by the second URI, within the network and prior to the establishing of the first encrypted connection, the network gateway provides the instructions to the client device 108 and the client device presents information based on the instructions to a user of the client device 108.

In some implementations, the instructions also include a continue with connection user interface element that receives input from a user of the client device 108 where the input indicates whether to establish the first encrypted connection and the second encrypted connection. For example, when the client device 108 receives input indicating that the encrypted connections should be established, the client device provides the input to the network gateway 102 or the MitM gateway 106, depending on which gateway provided the client device 108 with the instructions, and the MitM gateway 106 establishes the first and the second encrypted connections.

Alternatively, when the client device 108 receives input indicating that the encrypted connections should not be established, the MitM gateway 106 does not establish the first encrypted connection or the second encrypted connection and the client device 108 is prevented from accessing the first resource.

In certain implementations, the MitM gateway 106 determines the policy group 104 associated with the client device 108 based on data associated with the client device. For example, the network gateway 102 may append one or more client device parameters to the redirect response provided to the client device 108 where the client device parameters identify a user group and/or a policy group associated with the client device 108. When the client device 108 establishes the first encrypted connection with the MitM gateway 106, the MitM gateway 106 receives the client device parameters from the client device 108 and uses the client device parameters to identify the policy group 104 associated with the client device 108 and the rules included in the policy group 104 to apply to communications between the client device 108 and the server 118.

In another example, the network gateway 102 provides the client device 108 with a cookie, and the MitM gateway 106 receives one or more parameters included in the cookie from the client device 108 when establishing the first encrypted connection, and uses the parameters to identify the policy group 104 associated with the client device 108.

In other examples, the MitM gateway 106 uses the internet protocol address of the client device 108 to identify the policy group 104 associated with the client device 108.

In some implementations, when connections to access the first resource require a cookie on the client device 108, the MitM gateway 106 updates the cookie before forwarding the cookie to the client device 108 or the server 118. For example, when the MitM gateway 106 receives cookie information from the client device 108, the MitM gateway 106 changes all occurrences of the second URI to the first URI, and sends the updated cookie information to the server 118. Similarly, when the MitM gateway 106 receives cookie information from the server 118, the MitM gateway 106 all occurrences of the first URI to the second URI, and sends the updated cookie information to the client device 108.

The MitM gateway 106 may determine which URI to use when updating cookie information based on the specific client device 108 or the specific server 118 that the MitM gateway 106 receives cookie information from or based on some of the cookie information. For example, when the MitM gateway 106 uses a single domain for connections with client devices on the network 100, the MitM gateway 106 may use the IP address of a specific client device or a user identifier included in a cookie to determine which server is associated with the cookie. In another example, the MitM gateway 106 may use resource information identified in the cookie to determine which client device or server is associated with the cookie, depending on the device the MitM gateway 106 receives the cookie from.

Figure 4:
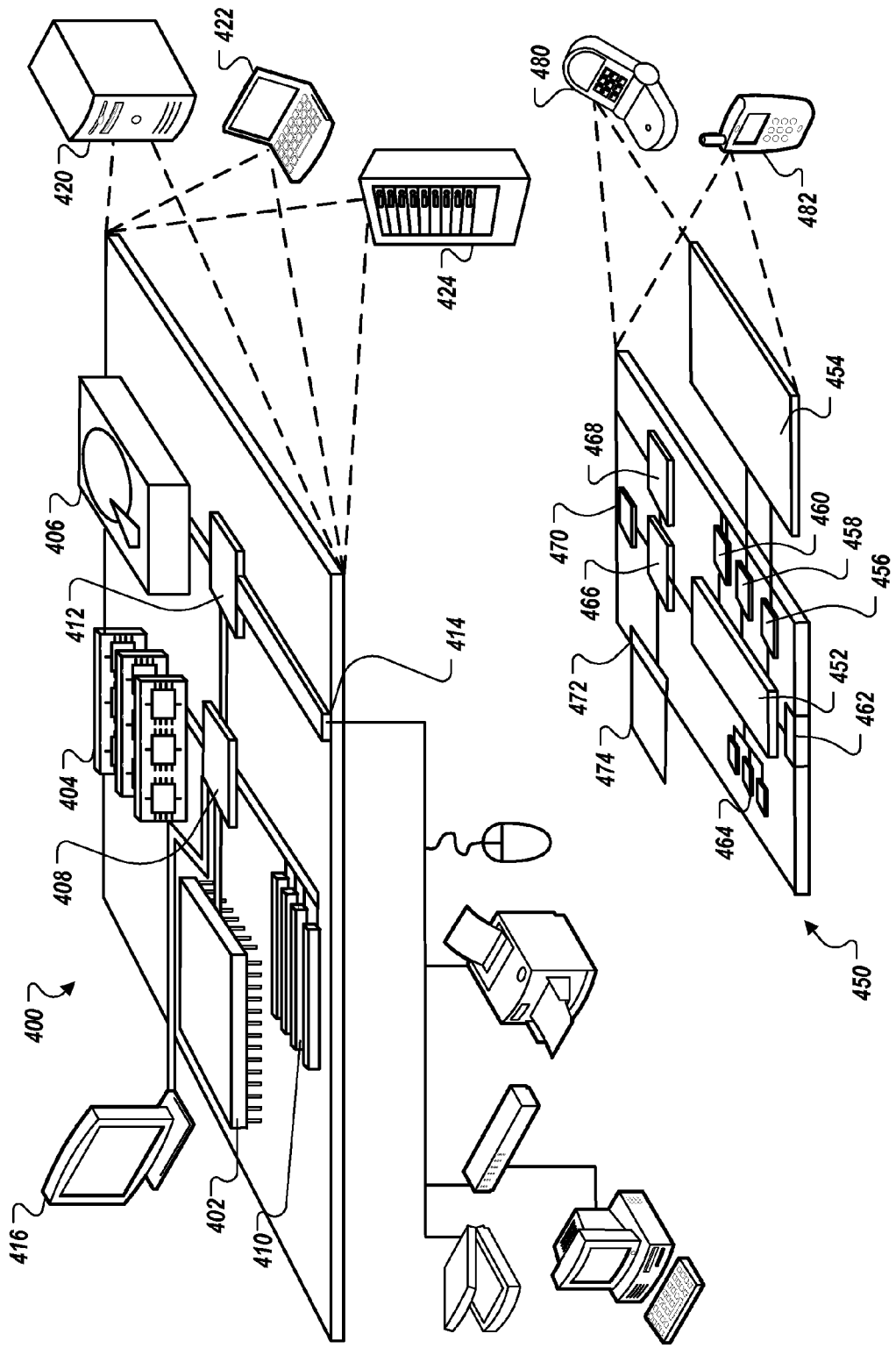
FIG. 4 is a block diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high speed interface 408 connecting to memory 404 and high speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed interface 408 manages bandwidth-intensive operations for the computing device 400, while the low speed interface 412 manages lower bandwidth-intensive operations. Such allocation of functions is exemplary only. In one implementation, the high speed interface 408 is coupled to memory 404, display 416 (e.g., through a graphics processor or accelerator), and to high speed expansion ports 410, which may accept various expansion cards (not shown). In the implementation, low speed interface 412 is coupled to storage device 406 and low speed bus 414. The low speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 402 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting impersonation on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by data apparatus, the method comprising:
    presenting, on a device, a display region within a graphical user interface;
    receiving, from a user, input to navigate to a first universal resource identifier that identifies a first resource;
    transmitting, by the device, a first request, the first request including the first universal resource identifier;
    receiving, by the device, a redirect response that includes a second universal resource identifier, the second universal resource identifier comprising a domain associated with a man-in-the-middle gateway and further comprising at least a portion of the first universal resource identifier;
    displaying, by the device to the user, at least the domain associated with the man-in-the-middle gateway in response to receiving, from the user, the input; and
    transmitting, by the device, a second request to access the first resource, the second request including the second universal resource identifier.

2. The method of claim 1, wherein transmitting the second request to access the first resource causes:
    establishment of a first encrypted connection between the device and the man-in-the-middle gateway, and a second encrypted connection between the man-in-the-middle gateway and a server hosting the first resource, to facilitate encrypted communication traffic between the device and the server hosting the resource; and
    decryption and inspection of the encrypted communication traffic passing between the device and the server hosting the resource.

3. The method of claim 1, wherein the first request further includes a cookie associated with the resource and the first universal resource identifier; and
    wherein the method further comprises receiving, by the device, a second cookie associated with the resource and the second universal resource identifier.

4. The method of claim 1, the method further comprising:
    receiving, by the device, instructions for presentation to the user with a notification regarding redirection from the first universal resource identifier to the second universal resource identifier; and
    presenting, to the user, the notification.

5. The method of claim 1, the method further comprises:
    presenting, by the device, a user interface element to receive input from the user to continue with the redirections; and
    wherein the second request is transmitted responsive to receiving the input from the user to continue with the redirection.

6. The method of claim 1, wherein a web browser comprises the graphical user interface.

7. The method of claim 1, the method further comprising:
    receiving, from a user, second input to navigate to a third universal resource identifier that identifies a second resource;
    transmitting, by the device, a third request, the third request including the third universal resource identifier; and
    wherein transmitting the third request causes establishment of a third encrypted connection between the device and a second server hosting the second resource, to facilitate encrypted communication traffic between the device and the server hosting the resource.

8. A system comprising:
    a device comprising a graphical user interface, the device configured to:
        present a display region within a graphical user interface;
        receive, from a user, input to navigate to a first universal resource identifier that identifies a first resource;
        transmit a first request, the first request including the first universal resource identifier;
        receive a redirect response that includes a second universal resource identifier, the second universal resource identifier comprising a domain associated with a man-in-the-middle gateway and further comprising at least a portion of the first universal resource identifier;
        display at least the domain associated with the man-in-the-middle gateway in response to receiving, from the user, the input; and
        transmit a second request to access the first resource, the second request including the second universal resource identifier.

9. The system of claim 8, wherein transmitting the second request to access the first resource causes:
    establishment of a first encrypted connection between the device and the man-in-the-middle gateway, and a second encrypted connection between the man-in-the-middle gateway and a server hosting the first resource, to facilitate encrypted communication traffic between the device and the server hosting the resource; and decryption and inspection of the encrypted communication traffic passing between the device and the server hosting the resource.

10. The system of claim 8, wherein the first request further includes a cookie associated with the resource and the first universal resource identifier; and wherein the device is further configured to receive, by the device, a second cookie associated with the resource and the second universal resource identifier.

11. The system of claim 8, wherein the device is further configured to:

receive instructions for presentation to the user with a notification regarding redirection from the first universal resource identifier to the second universal resource identifier; and present, to the user, the notification.

12. The system of claim 8, wherein the device is further configured to:

present a user interface element to receive input from the user to continue with the redirections; and wherein the second request is transmitted responsive to receiving the input from the user to continue with the redirection.

13. The system of claim 8, wherein a web browser comprises the graphical user interface.

14. The system of claim 8, wherein the device is further configured to:

receive, from a user, second input to navigate to a third universal resource identifier that identifies a second resource;

transmit a third request, the third request including the third universal resource identifier; and wherein transmitting the third request causes establishment of a third encrypted connection between the device and a second server hosting the second resource, to facilitate encrypted communication traffic between the device and the server hosting the resource.

15. A system comprising:

means for generating a graphical user interface; and a device configured to:

present a display region within a graphical user interface;

receive, from a user, input to navigate to a first universal resource identifier that identifies a first resource;

transmit a first request, the first request including the first universal resource identifier;

receive a redirect response that includes a second universal resource identifier, the second universal resource identifier comprising a domain associated with a man-in-the-middle gateway and further comprising at least a portion of the first universal resource identifier;

display at least the domain associated with the man-in-the-middle gateway in response to receiving, from the user, the input; and transmit a second request to access the first resource, the second request including the second universal resource identifier.

16. The system of claim 15, wherein transmitting the second request to access the first resource causes:

establishment of a first encrypted connection between the device and the man-in-the-middle gateway, and a second encrypted connection between the man-in-the-middle gateway and a server hosting the first resource, to facilitate encrypted communication traffic between the device and the server hosting the resource; and decryption and inspection of the encrypted communication traffic passing between the device and the server hosting the resource.

17. The system of claim 15, wherein the first request further includes a cookie associated with the resource and the first universal resource identifier; and wherein the device is further configured to receive, by the device, a second cookie associated with the resource and the second universal resource identifier.

18. The system of claim 15, wherein the device is further configured to:

receive instructions for presentation to the user with a notification regarding redirection from the first universal resource identifier to the second universal resource identifier; and present, to the user, the notification.

19. The system of claim 15, wherein the device is further configured to:

present a user interface element to receive input from the user to continue with the redirections; and wherein the second request is transmitted responsive to receiving the input from the user to continue with the redirection.

20. The system of claim 15, wherein a web browser comprises the graphical user interface.

21. The system of claim 15, wherein the device is further configured to:

receive, from a user, second input to navigate to a third universal resource identifier that identifies a second resource;

transmit a third request, the third request including the third universal resource identifier; and wherein transmitting the third request causes establishment of a third encrypted connection between the device and a second server hosting the second resource, to facilitate encrypted communication traffic between the device and the server hosting the resource.

\* \* \* \* \*